(12) United States Patent
Olsen

(10) Patent No.: US 8,387,609 B2
(45) Date of Patent: Mar. 5, 2013

(54) GRILL

(75) Inventor: Thomas A Olsen, Acworth, GA (US)

(73) Assignee: Sure Heat Manufacturing, Inc., Marietta, GA (US)

( * ) Notice: Subject to any disclaimer, the term of this patent is extended or adjusted under 35 U.S.C. 154(b) by 402 days.

(21) Appl. No.: 12/709,567

(22) Filed: Feb. 22, 2010

(65) Prior Publication Data

US 2011/0203568 A1 Aug. 25, 2011

(51) Int. Cl.
*A47J 37/00* (2006.01)

(52) U.S. Cl. ............ 126/25 R; 126/9 R; 126/41 R; 126/39 R; 126/194; 126/334; 206/320; 206/326; 206/586

(58) Field of Classification Search .......... 126/25 R, 126/9 R, 41 R, 39 R, 194, 334; 206/320, 206/326, 586

See application file for complete search history.

(56) References Cited

U.S. PATENT DOCUMENTS

| | | | | |
|---|---|---|---|---|
| 2,566,186 | A | * | 8/1951 | Gillett ........................ 312/323 |
| 3,931,805 | A | | 1/1976 | Nelson |
| 4,697,504 | A | | 10/1987 | Keating |
| 5,050,577 | A | * | 9/1991 | Baynes et al. ............... 126/9 R |
| 5,050,731 | A | * | 9/1991 | Baynes et al. ............... 206/320 |
| 5,213,027 | A | | 5/1993 | Tsotsos et al. |
| 6,202,638 | B1 | | 3/2001 | Didio-Sayer |
| 6,581,587 | B1 | | 6/2003 | Helms |
| 6,701,577 | B1 | | 3/2004 | Yeh |
| 7,117,866 | B2 | | 10/2006 | Cantal |
| 7,475,632 | B2 | | 1/2009 | Home |
| 7,575,000 | B2 | | 8/2009 | Jones |
| 2011/0094494 | A1 | * | 4/2011 | Malumyan ................. 126/25 R |

* cited by examiner

*Primary Examiner* — Steven B McAllister
*Assistant Examiner* — Avinash Savani
(74) *Attorney, Agent, or Firm* — Baker Donelson; Dorian B. Kennedy

(57) ABSTRACT

A grill (10) includes a base (11) and a grill assembly (12) pivotally coupled to the base. The base includes a two oppositely disposed sides (14) which define an empty storage space (16). The grill assembly is pivotal between a stowed position generally contained within the base empty space and an operational position generally situation outside the base empty space.

6 Claims, 5 Drawing Sheets

GRILL

TECHNICAL FIELD

This invention relates generally to grills, and more particularly to grills having hoods.

BACKGROUND OF THE INVENTION

Cooking grills have existed for many years. These cooking grills typically include a bottom housing, a cooking grate positioned near the top of the housing, and a hood which is able to cover a cooking grate and the top of the housing. Typically, the hood is designed to pivot so that it may be moved between a closed position covering the cooking grate and an open position exposing the cooking grate.

These grills are oftentimes packaged in multiple pieces to reducing the volume or size of the shipping container. Thus, a buyer is often burdened with the tedious and time consuming task of assembly the grill. Other grills are shipped in a nearly completely assembled condition. However, these packaging of these "pre-assembled" grills are very large and therefore expensive to ship.

Accordingly, there is a need in the art for a grill that will be shipped in a nearly "pre-assembled" condition, but which also provides minimal size and volume of the shipping container. It is to the provision of such therefore that the present invention is primarily directed.

SUMMARY OF THE INVENTION

In a preferred form of the invention a grill comprises a base defining an interior space and a grill assembly having a housing and a hood coupled to the housing. The grill assembly is pivotally coupled to the base so as to pivot between a stowed position with a majority of the grill assembly positioned within the base interior space and an operational position with a majority of the grill assembly positioned outside the base interior space.

DETAILED DESCRIPTION

Figure 1:
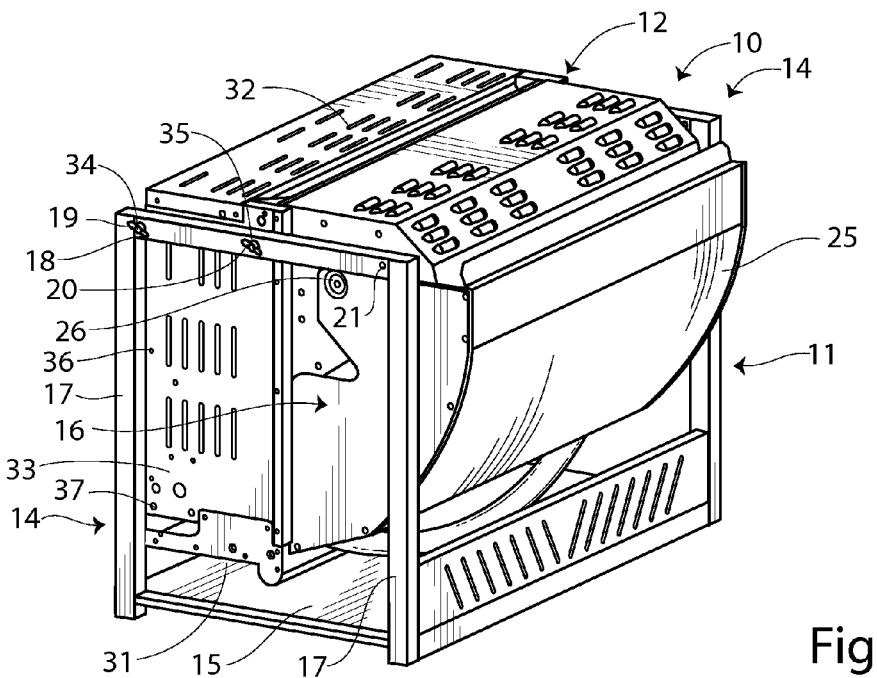
FIG. 1 is a perspective view of the grill embodying principles of the invention in a preferred form, shown with the grill assembly portion in a stowed position.

With reference next to the drawings, there is shown a a grill 10 according to the present invention. The grill 10 includes a frame or base 11 and a grill assembly 12 coupled to the base 11. The base 11 includes a two oppositely disposed side walls or sides 14 and a bottom 15 which together define an empty storage space 16. Each side wall or side 14 includes two upright stanchions 17 and a top bar 18 extending between the stanchions 17. Each top bar 18 has a first mounting hole 19, a second mounting hole 20, and a third mounting hole 21. A back bar 22 also extends between the two sides.

Figure 2:
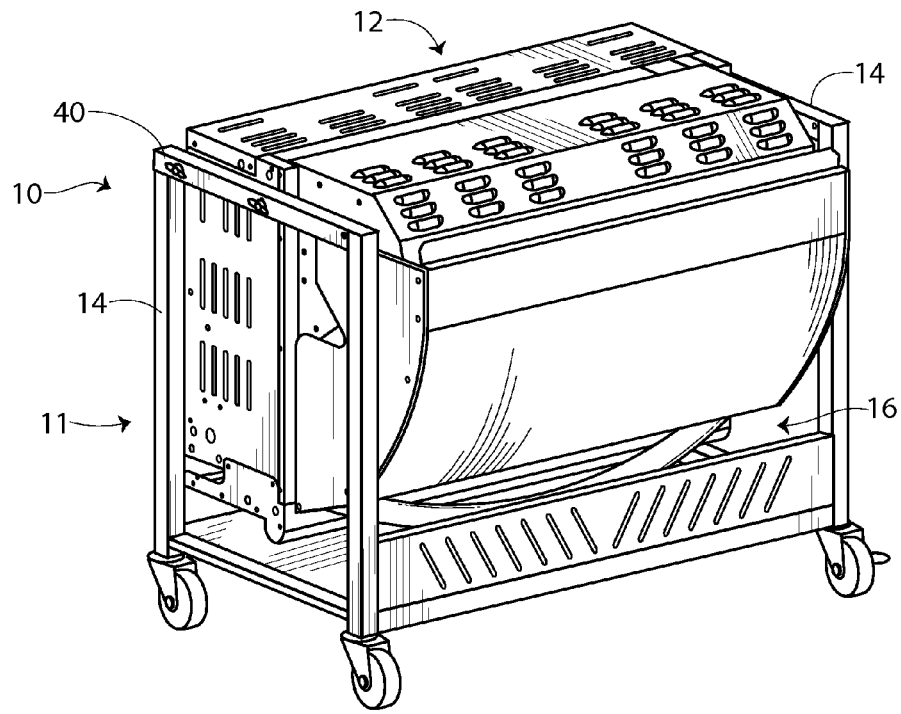
FIG. 2 is a perspective view of the grill of FIG. 1, shown with the grill assembly portion in a stowed position

The grill assembly 12 includes a lower basin or housing 24 defining an unshown, conventional grate opening and a hood 25 pivotally coupled to the lower housing 24 through a hinge 26. The hood 25 includes a mounting hole 28 on each side adjacent the rear end of the hood. Hood mounting screws or bolts 29 extend through the mutually aligned base third mounting holes 21 and hood mounting holes 28 when the grill assembly is in a stowed position shown in FIGS. 1 and 2. The grill assembly is oriented vertically or perpendicular to the base when in the stowed position. Gas burners and related equipment are positioned within the housing in conventional fashion to produce heat beneath or adjacent to the grate opening. The cooking grate is coupled to the base housing 24 in conventional fashion so that food placed upon the cooking grate is cooked by the heat produced by the gas burners and related equipment. It should be understood that even though the description herein primarily refers to a gas burner, any alternative heat form may also be utilized, such as charcoal, electric heating elements, and other conventionally known heating means.

The housing 24 includes a front wall 31, a rear wall 32, and two oppositely disposed side walls 33 extending between the front wall 31 and rear wall 32. Each side wall 33 includes a bottom rear or first mounting hole 34, a top rear or second mounting hole 35, a bottom middle or third mounting hole 36, and a bottom front or fourth mounting hole 37.

With the grill assembly 12 in a stowed position pivoted into base empty space 16, first housing mounting screws or bolts 40 extend through the mutually aligned base first mounting holes 19 and housing first mounting holes 34. Similarly, second housing mounting screws or bolts 41 extend through the mutually aligned base second mounting holes 20 and housing second mounting holes 35. The first and second mounting screws 40 and 41 and the hood mounting screws 29 insures that the grill assembly 12 is secure and stationary relative to the base 11. The back bar 22 also aids in preventing the pivotal movement of the grill assembly 12 past its desired stowed position.

Figure 3:
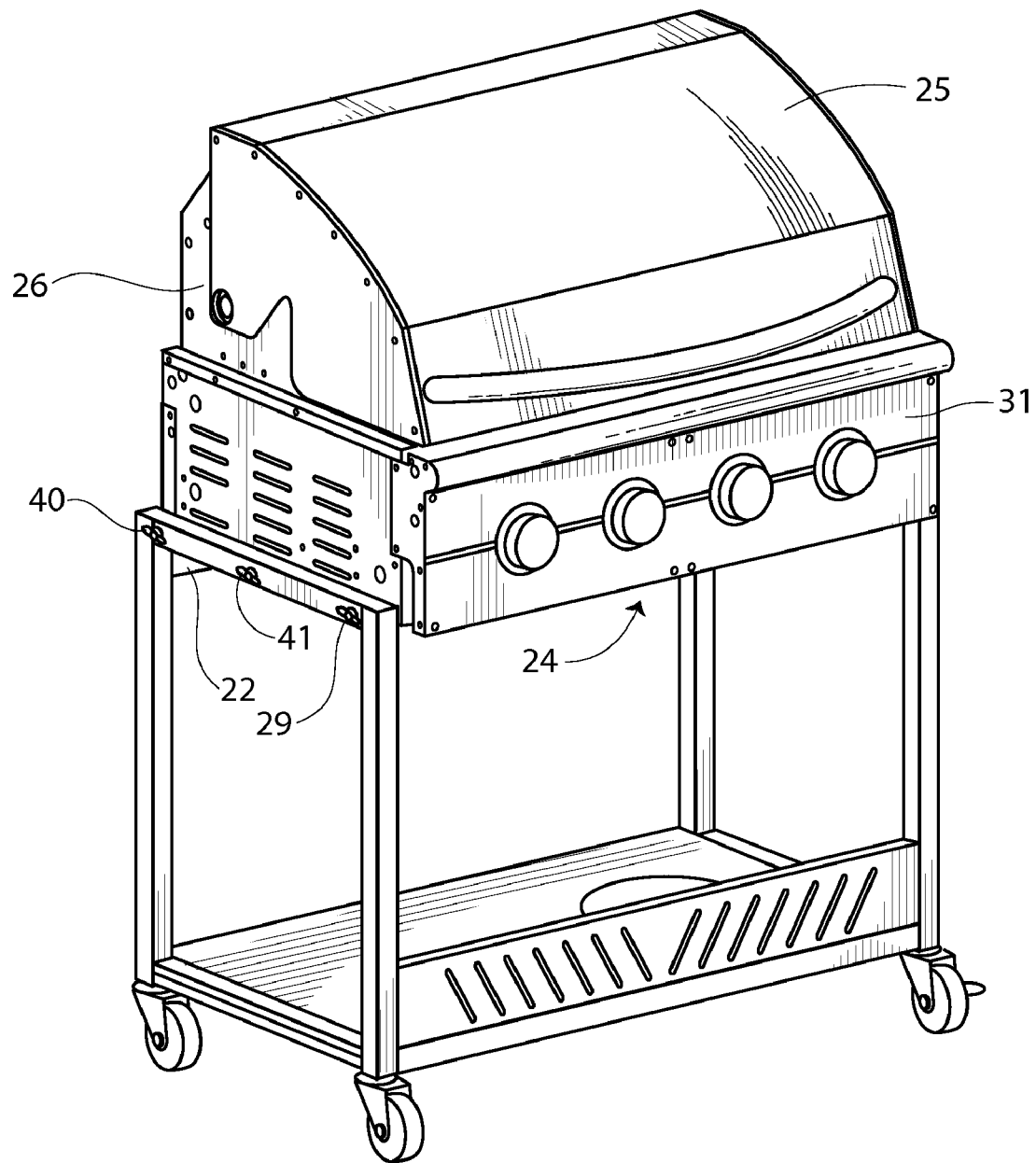
FIG. 3 is a perspective view of the grill of FIG. 1, shown with the grill assembly portion in an operational position.
Figure 4:
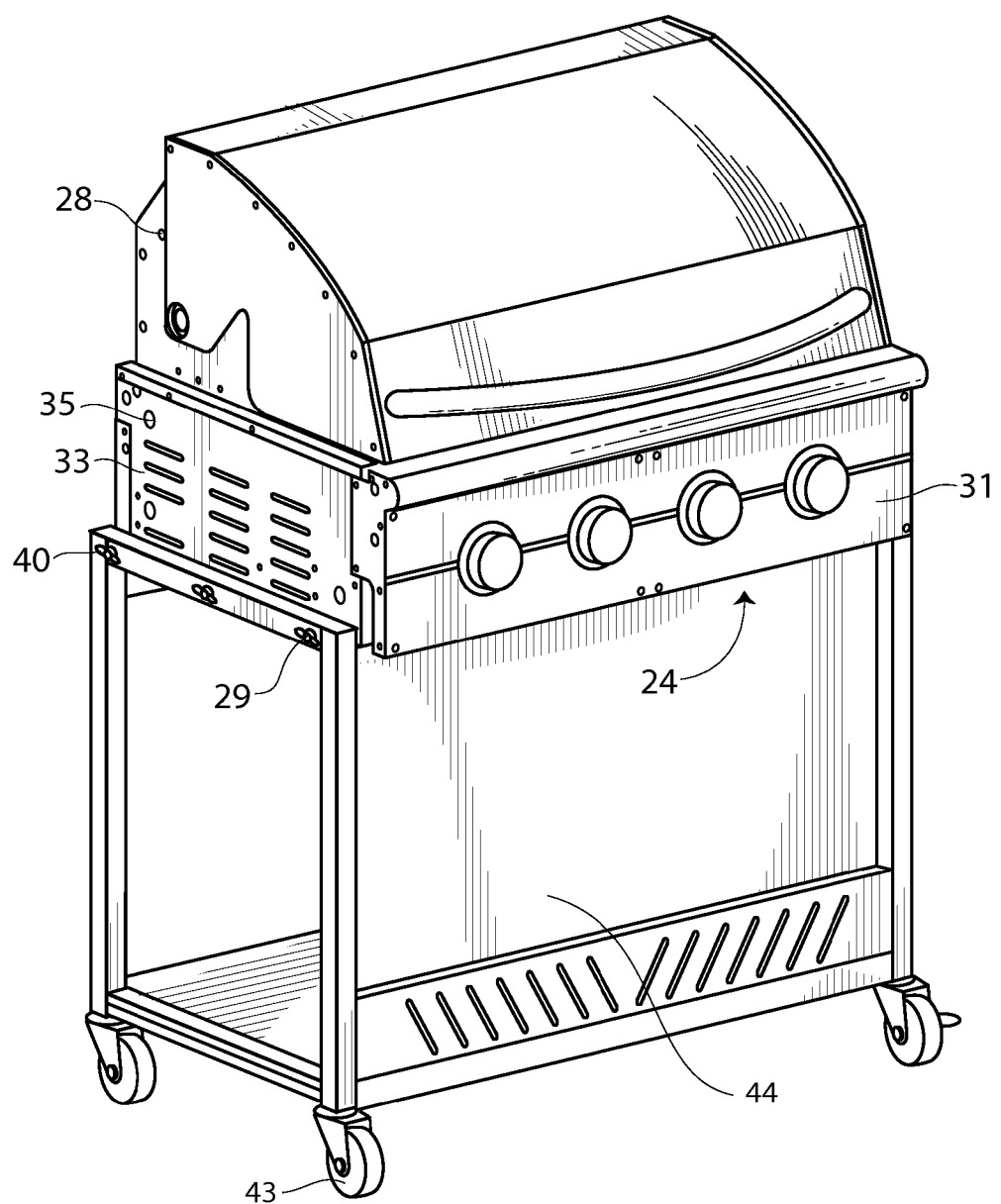
FIG. 4 is a perspective view of the grill of FIG. 1, shown with the grill assembly portion in an operational position.
Figure 5:
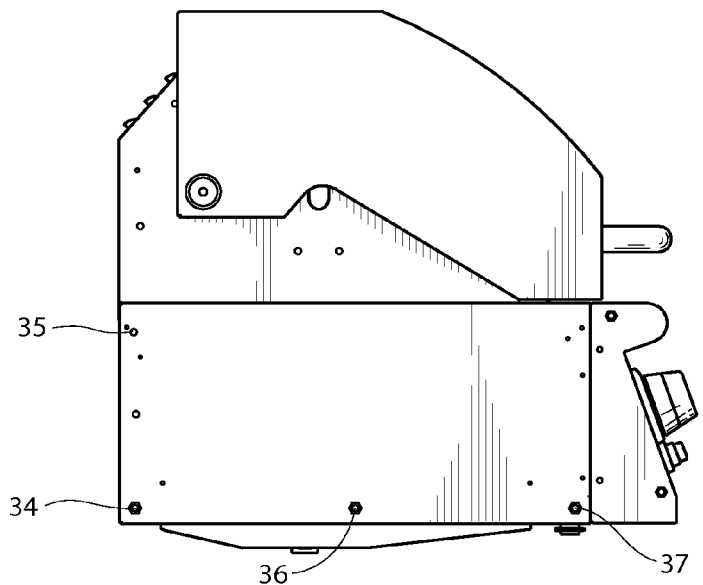
FIG. 5 is a side view of the grill assembly of FIG. 1.

The grill assembly 12 is pivoted from its stowed position (FIGS. 1 and 2) to its operational position (FIGS. 3 and 4) by removing housing second mounting screws 41 from the housing second mounting holes 35 and hood mounting screws 29 from the hood mounting holes 28. The grill assembly to oriented horizontally or parallel to the base when in a operational position. The removal of screws 41 and 29 allow the grill assembly to pivot about housing first mounting screws 40, thereby allowing a person to pivot the grill assembly to its operational position. Once the grill assembly is moved to its operational position, the second housing mounting screws 41 are extended into housing third mounting holes 36 to secure the grill assembly in its operational position. For additional support, the hood mounting screw 29 or an additional housing mounting screw may be extended through base third mounting hole 21 and into housing fourth mounting hole 37.

It should be understood that the grill assembly may be easily moved from a stowed position with a majority of the grill assembly residing within the base empty space 16 to an operational position for use with a majority of the grill assembly being positioned outside said base empty space. The stowed position allows for an nearly complete assembly of the grill 10 but minimizes the overall height of the gill by stowing the grill assembly 12 within the empty space of the base. It should be understood that when the height of the grill assembly is greater than the depth of the base a portion of the grill assembly will extend beyond the parameters of the base.

Yet, the grill assembly may be quickly and easily pivoted to an operational position for use. While the pivoting of the grill assembly and the securing of such has been illustrated in the preferred embodiment through the use of mounting screws, it should be understood that hinges, brackets, or other types of linkage may be utilized as an alternative. Also, additional or ancillary conventional grill parts may be added to the grill without effecting the principles of the current invention, such as castors, wheels 43, side shelves, side burners, handles, front panel 44, side panels, or the like.

It should be understood that the position of the first housing mounting screw 40, or pivot pin for all intensive purposes, may be located at various positions along the base. For example, the screw or pivot pin may be positioned midway along the top bar so that the grill assembly may be pivoted or inverted 180 degrees between its stowed position and operational position. As the second housing mounting screw 41 or additional housing mounting screw 42 are utilized to lock the position of the grill assembly relative to the base, these screws may be referred to herein as locking or set screws or pins.

Figure 6:
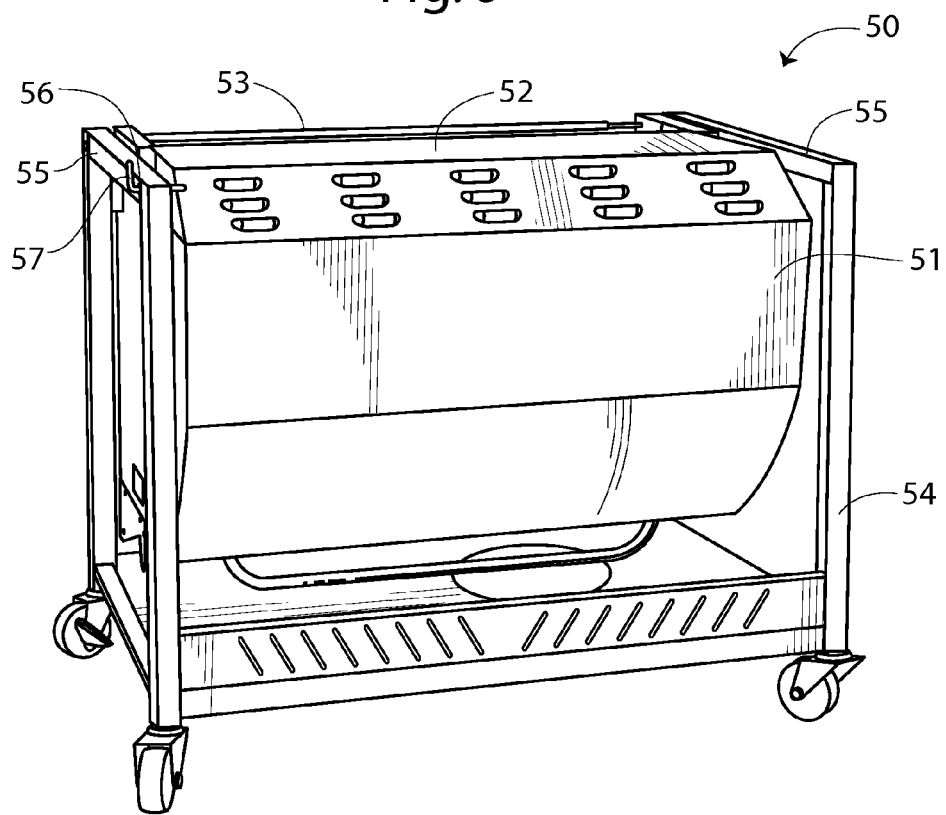
FIG. 6 is a perspective view of a grill in another preferred embodiment, shown in a stowed position.
Figure 7:
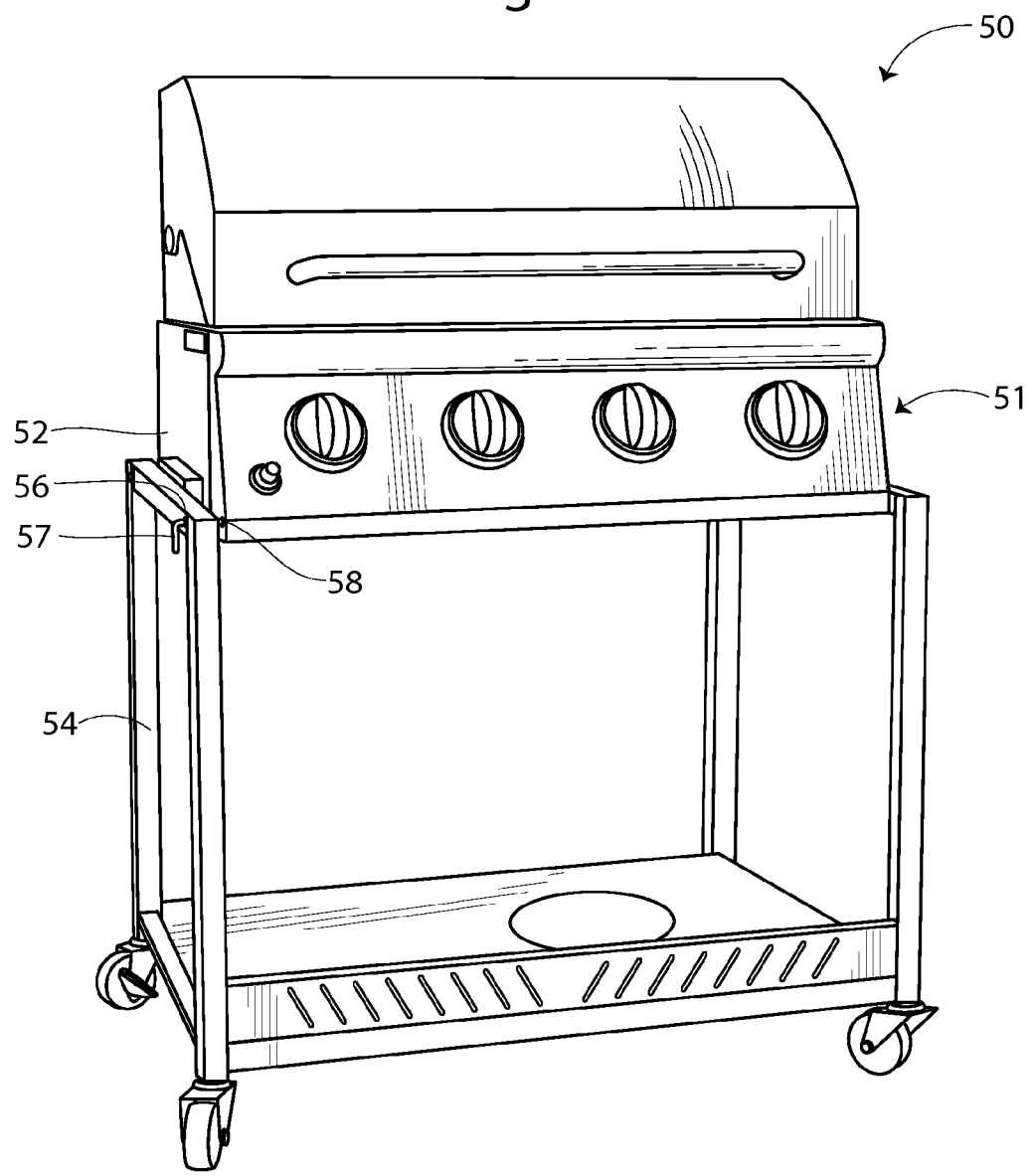
FIG. 7 is a perspective view of the grill of FIG. 6, shown in an operational position.

With reference next to FIGS. 6 and 7, there is shown a grill 50 in another preferred form of the invention. Here, the grill is very similar to that shown in the previous embodiment with a few simple variations. The grill assembly 51 includes a housing 52 having a pivot rod 53 which is pivotally mounted to the top, rear of the base 54. As such, the opposite ends of the pivot rod 53 may be considered to be part of the housing side wall. Also, the top bar 55 has a mounting hole 56 in which a spring loaded locking or set pin 57 is mounted. The locking pin 57 is designed to extend through the top bar 55 far enough to extend into the path of the pivoting grill assembly, thereby preventing the pivotal movement of the grill assembly when it is in its stowed position shown in FIG. 6. The locking pin 57 may be manually pulled back to allow pivotal movement of the grill assembly to its operational position, shown in FIG. 7, where it is then released to allow the locking pin 57 to extending into a housing mounting hole 58 in the grill assembly. The placement of the locking pin 57 within housing mounting hole 58 locks the grill assembly in its operational position.

While this invention has been described in detail with particular reference to the preferred embodiments thereof and the best mode of practicing same, it will be understood that variations and modifications can be effected within the spirit and scope of the invention as described herein above and as set forth in the appended claims.

The invention claimed is:

1. A grill comprising:
a base defining an interior space; and
a grill assembly having a housing and a hood coupled to said housing, said grill assembly being pivotally coupled to said base so as to pivot between a stowed position with a majority of said grill assembly positioned within said base interior space and an operational position with a majority of said grill assembly positioned outside said base interior space,
wherein said base includes two oppositely disposed side walls and wherein each base side wall has at least a first base mounting hole and a second base mounting hole, and wherein said housing has two oppositely disposed side walls and wherein each housing side wall has at least a first housing mounting hole, a second housing mounting hole, and a third housing mounting hole, wherein said grill includes a pair of first housing mounting screws wherein each first housing mounting screw extends through said first base mounting hole and said first housing mounting hole, and wherein said grill includes a pair of second housing mounting screws wherein each second housing mounting screw extends through said second base mounting hole and said second housing mounting hole with the grill assembly in its stowed position and extends through said second base mounting hole and said third housing mounting hole with the grill assembly in its operational position.

2. The grill of claim 1 wherein said grill further includes at least one set pin extending from said base side wall to a position engaging said grill assembly to lock the position of the grill assembly relative to the base.

3. A grill comprising:
a base defining an internal space;
a grill assembly including a lower housing and a hood coupled to said lower housing, and
mounting means for coupling said grill assembly to said base for pivotal movement between a stowed position residing at least partially within said internal space and an operational position at least partially outside said internal space,
wherein said base includes two oppositely disposed side walls and wherein each base side wall has at least a first base mounting hole and a second base mounting hole, and wherein said housing has two oppositely disposed side walls and wherein each housing side wall has at least a first housing mounting hole, a second housing mounting hole, and a third housing mounting hole, wherein said grill includes a pair of first housing mounting screws wherein each first housing mounting screw extends through said first base mounting hole and said first housing mounting hole, and wherein said grill includes a pair of second housing mounting screws wherein each second housing mounting screw extends through said second base mounting hole and said second housing mounting hole with the grill assembly in its stowed position and extends through said second base mounting hole and said third housing mounting hole with the grill assembly in its operational position.

4. The grill of claim 3 wherein said grill further includes at least one set pin extending from said base side wall to a position engaging said grill assembly to lock the position of the grill assembly relative to the base.

5. A grill comprising:
a base defining an internal space;
a grill assembly including a lower housing and a hood coupled to said lower housing, and
mounting means for coupling said grill assembly to said base for pivotal movement between a generally vertical position for storage and a generally horizontal position for operation,
wherein said base includes two oppositely disposed side walls and wherein each base side wall has at least a first base mounting hole and a second base mounting hole, and wherein said housing has two oppositely disposed side walls and wherein each housing side wall has at least a first housing mounting hole, a second housing mounting hole, and a third housing mounting hole, wherein said grill includes a pair of first housing mounting screws wherein each first housing mounting screw extends through said first base mounting hole and said first housing mounting hole, and wherein said grill includes a pair of second housing mounting screws wherein each second housing mounting screw extends through said second base mounting hole and said second housing mounting hole with the grill assembly in its stowed position and extends through said second base mounting hole and said third housing mounting hole with the grill assembly in its operational position.

6. The grill of claim 5 wherein said grill further includes at least one set pin extending from said base side wall to a position engaging said grill assembly to lock the position of the grill assembly relative to the base.

* * * * *